No. 662,009. Patented Nov. 20, 1900.
F. A. MERRICK.
TROLLEY.
(Application filed Jan. 18, 1900.)
(No Model.)
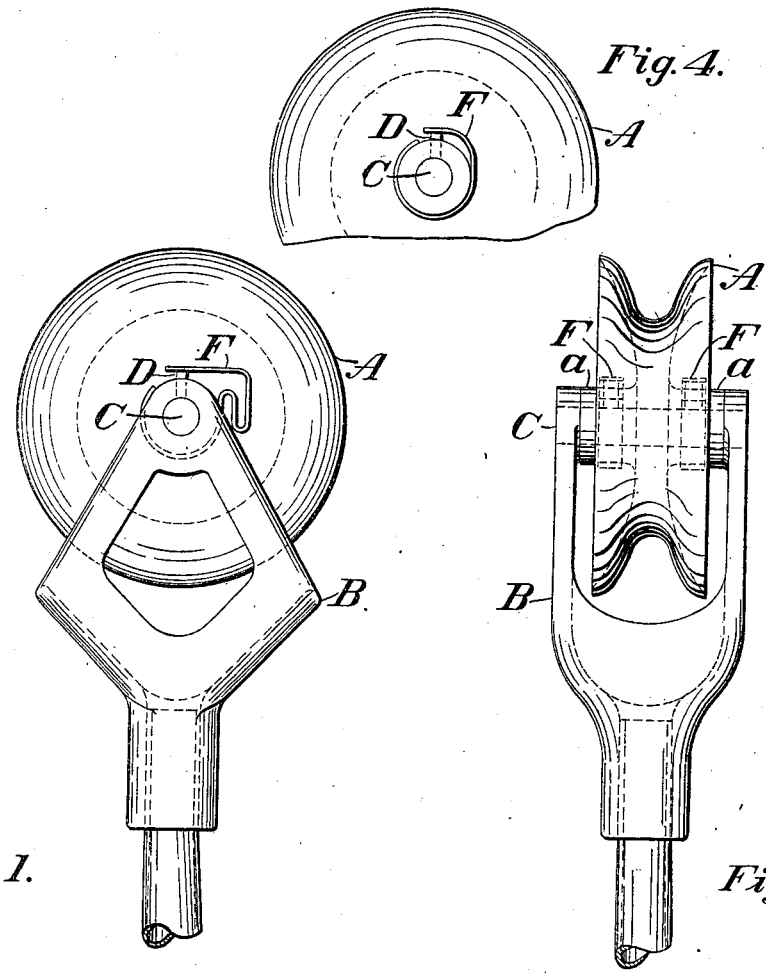
Fig.1. Fig.2. Fig.4.
Fig.3.
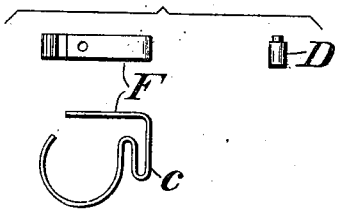
WITNESSES:
G. M. Powell.
M. E. Sharpe.
INVENTOR
F. A. Merrick,
BY
Geo. H. Parmelee,
his ATTORNEY.
THE NORRIS PETERS CO., PHOTO-LITHO., WASHINGTON, D. C.

UNITED STATES PATENT OFFICE.

FRANK A. MERRICK, OF JOHNSTOWN, PENNSYLVANIA, ASSIGNOR TO THE LORAIN STEEL COMPANY, OF PENNSYLVANIA.

TROLLEY.

SPECIFICATION forming part of Letters Patent No. 662,009, dated November 20, 1900.

Application filed January 18, 1900. Serial No. 1,882. (No model.)

*To all whom it may concern:*

Be it known that I, FRANK A. MERRICK, of Johnstown, in the county of Cambria and State of Pennsylvania, have invented a new and useful Improvement in Trolleys, of which the following is a full, clear, and exact description, reference being had to the accompanying drawings, which form a part of this specification.
My invention has relation to certain new and useful improvements in trolleys and is designed to provide means of simple, effective, practical, and durable character for maintaining constant electrical control between the trolley-wheel and the shaft or spindle upon which it rotates to prevent destructive arcing and sparking due to momentary separation of the bearing-surfaces of the wheel and spindle by reason of the vibrations or play of said wheel. It is also designed to provide a device of this character which can be readily applied and used in connection with standard constructions of trolley wheels and harps; also, a device in which the wear of contacting parts is reduced to a minimum and which can be readily removed from the wheel and replaced when worn to such an extent as to be no longer useful; also, to provide a device which is so located as to be protected from the action of stray arcs.

With these objects in view my invention consists of a contact device secured to the wheel or its hub and maintained in constant contact with the wheel shaft or spindle by a spring, which also connects it to said wheel or hub. One or more of these devices may be used on each wheel.

The invention also consists in the novel construction and combination of parts, all as hereinafter described, and pointed out in the appended claims, reference being had to the accompanying drawings, in which—

Figure 1 is a side view of a trolley harp and wheel, showing my invention applied thereto. Fig. 2 is an end view of the wheel and contact device removed from the harp. Fig. 3 is a detail view of the contact device detached, and Fig. 4 is a similar view showing a modified form of the same.
The letter A designates the trolley-wheel, having the hub portions $a$. B is the harp or fork in which it is hung, and C is the fixed shaft or spindle secured in the harp or fork and upon which the wheel is journaled.

The contact device consists in a radial pin or stud D, seated in an aperture in one of the hubs $a$, with its inner end bearing against the shaft or spindle C, and a spring-arm E, carrying said pin or stud and fixed at one end to the periphery of the hub by its natural spring clamping action by brazing, riveting, or otherwise. Said arm is of good conducting metal and is formed with a loop $c$ to give it a spring action of sufficient strength to at all times maintain the pin in contact with the shaft or spindle C, notwithstanding vibration or play of the wheel. The spring may, however, be of various forms. For instance, in Fig. 4 I have shown it as being of volute form encircling the hub $a$, and many other modifications may be made. One of the devices may, if desired, be applied to each hub.

Inasmuch as the contact between the wheel and spindle is made at the surface of the latter and but a short distance from the axis of rotation, the wear on the pin is reduced to a minimum, and as the pin can be made of considerable length to provide for wear the device is one of great durability. It is also thoroughly protected by its location from any arcing which may occur between the wheel and the overhead conductor.

As above indicated, I do not wish to limit myself to the particular construction herein shown and described, as various modifications may be made.

Having thus described my invention, what I claim, and desire to secure by Letters Patent, is—

1. In a trolley, the combination with a trolley-wheel, and a shaft or spindle upon which it rotates, of a spring-pressed contact device secured to said wheel and engaging the shaft or spindle through the hub of the wheel.

2. In a trolley, the combination with a trolley-wheel, and a shaft or spindle upon which it rotates, of a radial pin seated in the hub of said wheel and contacting with the shaft or spindle, and a spring secured to the wheel and carrying said pin.

3. In a trolley, the combination with a trolley-wheel, and a shaft or spindle upon which it rotates, of a radially-movable contact device seated in the hub of the wheel and bearing upon the said shaft or spindle, and a spring secured to the wheel and maintaining the bearing of said device.

4. In a trolley, the combination with a trolley-wheel, and the fixed shaft or spindle upon which it rotates, of a radial pin seated in the hub of said wheel and contacting with the hub or spindle, and a bent spring-arm carrying said pin at one end, and secured to the periphery of the hub at its opposite end.

5. The combination with a trolley-wheel having a projecting hub and a shaft or spindle for said wheel, of a spring secured to the periphery of said hub, and a contact device carried by the said spring and contacting with the said shaft or spindle.

6. The combination with a trolley-wheel having a projecting hub and a shaft or spindle for said wheel, of a spring partially encircling the said hub, and carrying a contact-pin which engages the shaft or spindle through the said hub.

In testimony whereof I have affixed my signature in presence of two witnesses.

FRANK A. MERRICK.

Witnesses:
M. E. SHARPE,
H. W. SMITH.